(12) United States Patent
Weissman (10) Patent No.: US 8,402,028 B2
(45) Date of Patent: Mar. 19, 2013

(54) SYSTEM, METHOD AND COMPUTER PROGRAM PRODUCT FOR CONDITIONALLY PERFORMING A QUERY INCLUDING AN AGGREGATE FUNCTION

(75) Inventor: Craig Weissman, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 10 days.

(21) Appl. No.: 13/035,870

(22) Filed: Feb. 25, 2011

(65) Prior Publication Data
US 2011/0208739 A1    Aug. 25, 2011

Related U.S. Application Data (60) Provisional application No. 61/308,237, filed on Feb. 25, 2010.

(51) Int. Cl.
    *G06F 17/30* (2006.01)
(52) U.S. Cl. ...................................................... 707/737
(58) Field of Classification Search .................. 707/737
    See application file for complete search history.

(56) References Cited

U.S. PATENT DOCUMENTS

| | | | | |
|---|---|---|---|---|
| 5,448,696 A | * | 9/1995 | Shimada et al. | 715/853 |
| 5,893,090 A | * | 4/1999 | Friedman et al. | 1/1 |
| 7,209,929 B2 | | 4/2007 | Dominguez, Jr. et al. | |
| 2003/0229884 A1 | * | 12/2003 | Carr et al. | 717/101 |
| 2003/0233404 A1 | | 12/2003 | Hopkins | |
| 2004/0083222 A1 | * | 4/2004 | Pecherer | 707/100 |
| 2005/0065925 A1 | | 3/2005 | Weissman et al. | |
| 2005/0223022 A1 | | 10/2005 | Weissman et al. | |
| 2005/0283478 A1 | | 12/2005 | Choi et al. | |
| 2006/0206834 A1 | | 9/2006 | Fisher et al. | |
| 2008/0086482 A1 | * | 4/2008 | Weissman | 707/10 |
| 2008/0288473 A1 | * | 11/2008 | Hu et al. | 707/4 |
| 2009/0077010 A1 | * | 3/2009 | Muras et al. | 707/2 |
| 2009/0288084 A1 | * | 11/2009 | Astete et al. | 718/1 |
| 2010/0229218 A1 | * | 9/2010 | Kumbalimutt et al. | 726/4 |

OTHER PUBLICATIONS

U.S. Appl. No. 60/828,192, filed Oct. 4, 2006.

* cited by examiner

*Primary Examiner* — Apu Mofiz
*Assistant Examiner* — Dara J Glasser
(74) *Attorney, Agent, or Firm* — Zilka-Kotab, PC (57) ABSTRACT

In accordance with embodiments, there are provided mechanisms and methods for conditionally performing a query including an aggregate function. These mechanisms and methods for conditionally performing a query including an aggregate function can limit performance of queries including aggregate functions based on a number or records associated with such performance of such aggregate functions. The ability to limit performance of queries including aggregate functions can enable performance quality of a computer system to be maintained.

13 Claims, 5 Drawing Sheets

SYSTEM, METHOD AND COMPUTER PROGRAM PRODUCT FOR CONDITIONALLY PERFORMING A QUERY INCLUDING AN AGGREGATE FUNCTION

CLAIM OF PRIORITY

This application claims the benefit of U.S. Provisional Patent Application 61/308,237 entitled "Aggregation in SOQL," by Craig Weissman, filed Feb. 25, 2010, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to queries in a computing environment.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional computer systems, a database query is used to retrieve records from a database. In some embodiments, the database query may be used in a system of record for retrieving the records simply for reading and/or writing purposes. In other embodiments, the database query may be used in an analytical system for retrieving the records and performing an analysis on the records. Unfortunately, traditional techniques utilized for performing database queries generally exhibit various limitations, particularly where governance of resource utilization is desired for maintaining performance quality of the computer system.

Just by way of example, in computer systems where resource utilization is governed, database queries are typically governed according to predefined limits on the number of results returned from the database queries (e.g. over a given period of time, etc.). Unfortunately, this type of governance may only be beneficial where the number of returned results is reflective of the number of records processed as a result of the database query. For example, governing resource usage based on thresholds for a number of returned results oftentimes allows database queries to proceed where such database queries include aggregate functions processing a large number of records, but returning only a small number of the processed records as a result of the aggregation.

Accordingly, it is desirable to provide techniques enabling database queries including aggregate functions to be conditionally performed based on a number of records processed by such aggregate function, to maintain performance quality of the computer system.

BRIEF SUMMARY

In accordance with embodiments, there are provided mechanisms and methods for conditionally performing a query including an aggregate function. These mechanisms and methods for conditionally performing a query including an aggregate function can enable embodiments to limit performance of queries including aggregate functions based on a number or records associated with such performance of such aggregate functions. The ability of embodiments to limit performance of queries including aggregate functions can enable performance quality of a computer system to be maintained.

In an embodiment and by way of example, a method for conditionally performing a query including an aggregate function is provided. In use, a query including an aggregate function to be performed on a plurality of records is received. Additionally, a number of the records associated with the performance of the aggregate function is determined. Furthermore, the query is conditionally performed based on the number of the records.

While one or more implementations and techniques are described with reference to an embodiment in which conditionally performing a query including an aggregate function is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are pr vided for conditionally performing a query including an aggregate function.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, mechanisms and methods for providing conditionally performing a query including an aggregate function will be described with reference to example embodiments.

Figure 1:
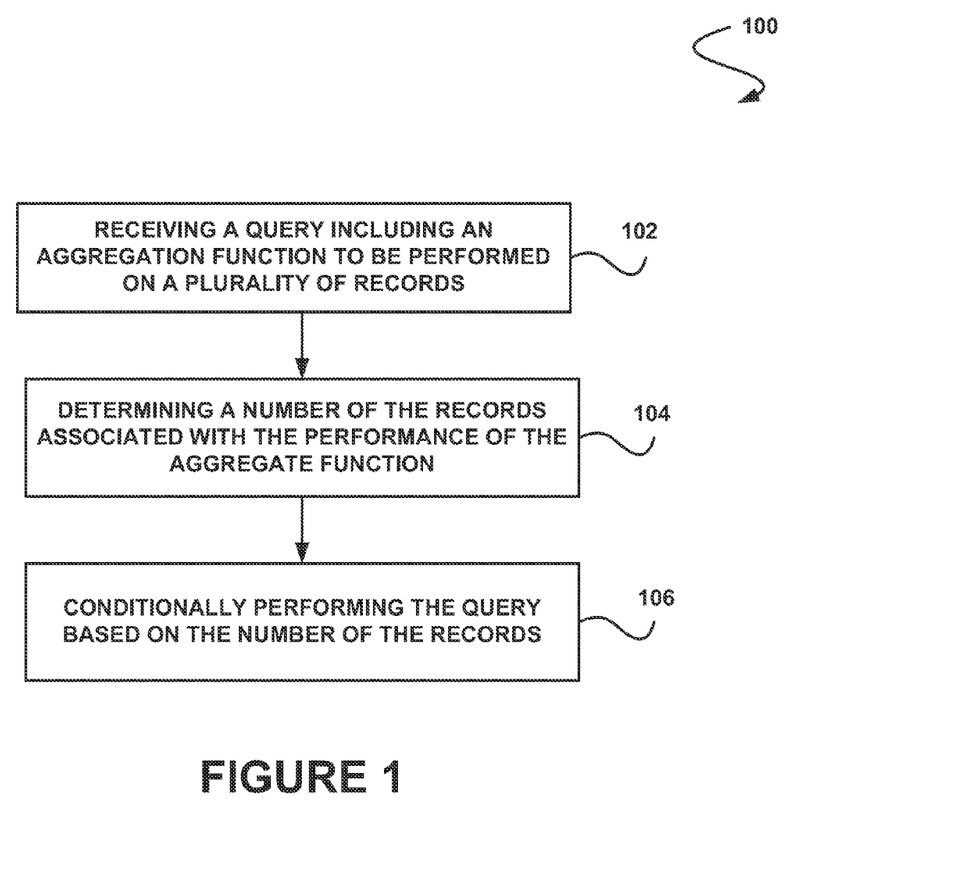
FIG. 1 illustrates a method for conditionally performing a query including an aggregate function, in accordance with an embodiment.

FIG. 1 illustrates a method 100 for conditionally performing a query including an aggregate function, in accordance with an embodiment. As shown in operation 102, a query including an aggregate function to be performed on a plurality of records is received. With respect to the present description, the query may include any code capable of being utilized to retrieve, and optionally process, records from a data set. For example, the query may include a function to retrieve records (i.e. rows) from a table in a database.

To this end, the query may select the records from a table in a database (e.g. via a SELECT statement). As noted above, the query includes an aggregate function to be performed on the records. Such aggregate function may include any function for aggregating at least a subset of the records (e.g. into a single record).

In one embodiment, the aggregate function may include grouping (e.g. combining, etc.) at least a subset of the records. For example, the subset of the records may be grouped according to a type of the aggregate function. Optionally, the aggregate function may include a GROUP BY function for grouping the records by particular criteria, a COUNT function for grouping records having a particular criteria and counting the number of records in the group, a DISTINCT function for grouping records distinct from a particular criteria and counting the number of records in the group, a MAX function for grouping records having a particular criteria and identifying a maximum value included in the records in the group, a MIN function for grouping records having a particular criteria and identifying a minimum value included in the records in the group, etc.

As noted above, the subset of the records may be grouped according to criteria, such as criteria defined in the query. The criteria may include a field of the records (i.e. a particular column of the table in the database), at least one value of such field (e.g. a single value, a range of values, etc.), or any other criteria capable of being utilized to group at least a subset of the records.

In one exemplary embodiment, an accounts table may include records each representing a different account, where multiple of the accounts may be owned by a single entity. In the present embodiment, each record may therefore include a field identifying the account being represented, and the owner of such account. Thus, just by way of example, the aggregate function may include grouping the records in the accounts table by owner.

As an option, the query may be received by a tenant of a multi-tenant on-demand database system. For example, the multi-tenant on-demand database system may store the database to be queried via the query. Accordingly, the query may be received by the multi-tenant on-demand database system for processing the query.

Additionally, as shown in operation 104, a number of the records associated with the performance of the aggregate function is determined. In one embodiment, the records associated with the performance of the aggregate function may include records processed by the aggregate function. Such records processed by the aggregate function may include records input to the aggregate function (i.e. for aggregating at least a subset of such records).

Just by way of example, the query may include a first statement that includes a selection function for selecting the records. The query may further include a second statement that includes the aggregate function for aggregating at least a subset of the selected records. With respect to such example, the records associated with the performance of the aggregate function may include the selected records on which the aggregate function is to be performed.

It should be noted that the number of the records may be determined in any desired manner. In one exemplary embodiment, the number of the records may be identified by counting the records to be processed by the aggregate function. With respect to the example described above, the selected records may be counted for determining number of the records associated with the performance of the aggregate function.

In another exemplary embodiment, the number of the records may be identified by counting records associated with a resultset output as a result of the aggregate function. For example, for each record of the resultest (e.g. including new records holding either a single record or holding multiple aggregated records), an implicit count expression may be included in each of those new records to count how many records have been aggregated in each of the new records. The counts resulting from the count expressions may then be summed to identify the number of the records associated with the performance of the aggregate function.

Furthermore, as shown in operation 106, the query is conditionally performed based on the number of the records. Thus, the query may be performed based upon the determined number of the records. Of course, in another embodiment, the query may not necessarily be performed (i.e. may be blocked from being performed or may otherwise be delayed from being performed) based upon the determined number of the records.

Just by way of example, conditionally performing the query based on the number of the records may include determining whether the number of the records exceeds an available usage of a predefined usage allotment. Such predefined usage allotment may include a total number of records allowed to be processed over a predetermined period of time. For example, the predefined usage allotment may be specific to the aforementioned tenant of the multi-tenant on-demand database system (e.g. provided to the tenant by an administrator of the multi-tenant on-demand database system).

Accordingly, the available usage may include an amount of the predefined usage allotment that is available for use. As an option, where the predefined usage allotment includes the total number of records allowed to be processed over the predetermined period of time, the available usage may include a portion of the total number of records which have not yet been used during the predetermined period of time. For example, if the total number of records allowed to be processed over the predetermined period of time includes 10,000 records, and 9,000 records have been processed already during the predetermined period of time, the available usage may be 1,000 records.

In one embodiment, conditionally performing the query based on the number of the records may include blocking performance of the query in response to a determination that the number of the records exceeds the available usage. In this way, the query may not necessary be allowed to be processed (e.g. by the multi-tenant on-demand database system). As another option, the query may be queued for processing until the predetermined period of time passes, such that the available usage is resent to the predefined usage allotment.

In another embodiment, conditionally performing the query based on the number of the records may include performing the query in response to a determination that the number of the records does not exceed the available usage. Thus, the multi-tenant on-demand database system may process the query, for example. In one embodiment, at least a subset of the records may be grouped during the performance of the query, using the aggregation function.

Moreover, the grouped subset may be returned using an object type specific to aggregated records. Optionally, the object type may only includes an identifier field (e.g. which identifies each record in the at least the subset of the records). As another option, the object type may also include a get_any( ) field which may include a function for accessing the records grouped using an object of the object type specific to aggregated records. Still yet, the available usage may be reduced by the determined number of the records, once the query is performed, such that the available usage reflects the processing of the records.

By conditionally performing the query based on the number of the records associated with the performance of the aggregate function, performance of the query may be limited (e.g. to situations where the number of the records is within an available usage). This type of limit may enable performance quality of a computer system to be maintained by ensuring that the query is limited based, at least partially, on a factor other than the results of the query.

Figure 2:
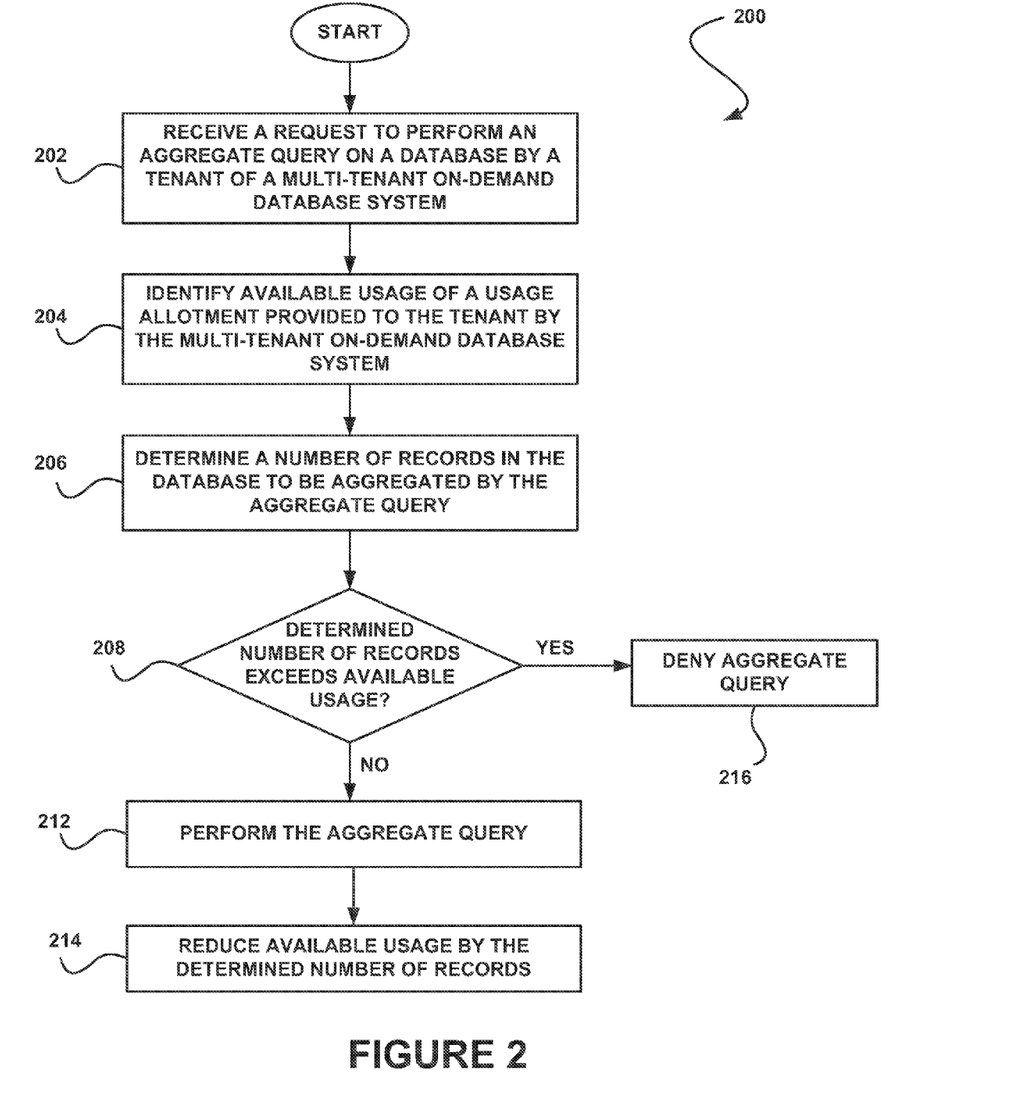
FIG. 2 illustrates a method for conditionally performing a query including an aggregate function based on a usage allotment provided to a tenant of a multi-tenant on-demand database system, in accordance with an embodiment.

FIG. 2 illustrates a method 200 for conditionally performing a query including an aggregate function based on a usage allotment provided to a tenant of a multi-tenant on-demand database system, in accordance with an embodiment. As an option, the present method 200 may be carried out in the context of the functionality of FIG. 1. Of course, however, the method 200 may be carried out in any desired environment. Again, the aforementioned definitions may apply during the present description.

As shown in operation 202, a request to perform an aggregate query on a database is received by a tenant of a multi-tenant on-demand database system. In the present embodiment, the aggregate query may include any query including an aggregation function. For example, the aggregation function to be performed on records indicated by the query.

In addition, available usage of a usage allotment provided to the tenant by the multi-tenant on-demand database system is identified. Note operation 204. The usage allotment may include a total number of records allowed to be processed by the tenant over a predetermined period of time. Thus, the available usage may include a portion of the total number of records which have not yet been used by the tenant over the predetermined period of time.

In one embodiment, the available usage may be identified from a log of the multi-tenant on-demand database system. Such log may track an amount of the usage allotment that the tenant has used, or conversely the available usage from such usage allotment. Thus, the log may be updated each time records are processed as a result of a query received by the tenant.

Further, as shown in operation 206, a number of records in the database to be aggregated by the aggregate query is determined. In one embodiment, the determination may be made by counting a number of records subject to the aggregate query. As also shown, it is then determined whether the determined number of records exceeds the available usage. Note decision 208. For example, the number of records subject to the aggregate query may be compared to the available usage identified in operation 204.

If it is determined that the determined number of records exceeds the available usage, the aggregate query is denied, as shown in operation 216. Optionally, the query may be rejected (i.e. sending a notification to the tenant that the aggregate query cannot be performed due to it exceeding the available usage of the usage allotment). As another option, the aggregate query may be delayed until the predetermined time period associated with the available usage has elapsed.

If it is determined that the determined number of records does not exceed the available usage, the aggregate query is performed. Note operation 212. For example, the multi-tenant on-demand database system may process the query against the database. Moreover, the available usage is reduced by the number of records determined in operation 206. Note operation 214. For example, the log described above may be updated to reflect that the available usage has been reduced by the determined number of records which have been processed by the query.

To this end, although a resultset returned from the query may be small, the total rows processed by the database and the work performed to arrive at the result could be large. Thus, the number of such queries that can be run, and the contexts in which they can be executed may be limited to maintain performance of system resources. For example, these limitations may ensure sharing of system resources among multiple tenants (e.g. so that a single tenant submitting queries for processing does not overly consume the system resources in a manner such that the system resources being shared with other tenants are not unfairly monopolized).

Thus, in one embodiment, the total number of records to be processed by the database may be captured and possibly included in a time-windowed resource usage threshold for that tenant. This capturing may be performed by adding implicit count expressions for each record of the resultset, and summing those, in one embodiment. In another embodiment, a number of records that can be aggregated by a tenant in a given time-window may be limited. Just by way of example, number of records per day allowed to be processed for the tenant may be a number of licenses multiplied by a threshold for the tenant. In yet another embodiment, the actual input records from the aggregate query may be identified and counted against the threshold for the tenant.

Figure 3:
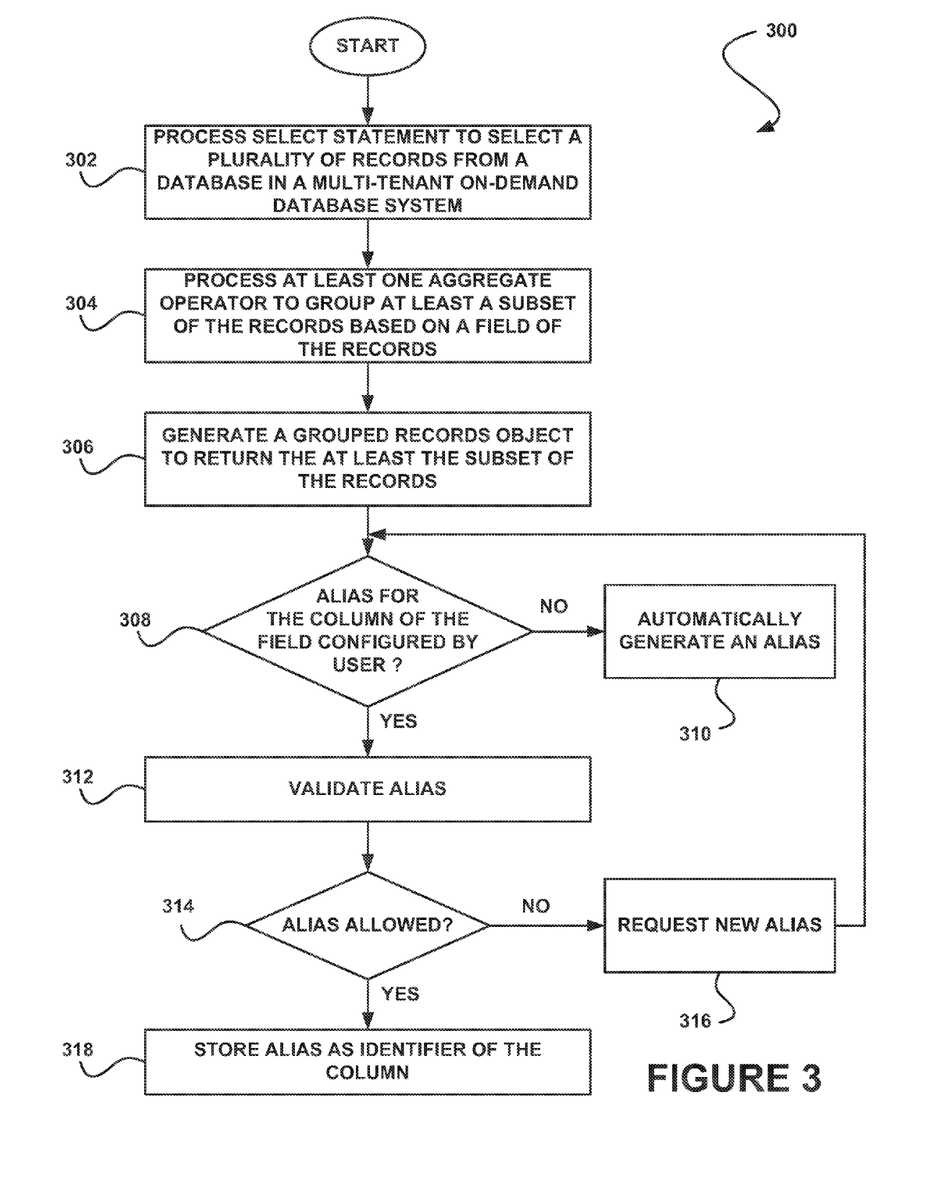
FIG. 3 illustrates a method for performing a query including an aggregate function, in accordance with an embodiment.

FIG. 3 illustrates a method 300 for performing a query including an aggregate function, in accordance with an embodiment. As an option, the present method 300 may be carried out in the context of the functionality of FIGS. 1-2. For example, the method 300 may be performed in response to operation 212 of FIG. 2 initiating the performance of an aggregate query. Of course, however, the method 300 may be carried out in any desired environment. Again, the aforementioned definitions may apply during the present description.

As shown in operation 302, a select statement is processed to select a plurality of records from a database in a multi-tenant on-demand database system. The select statement may include any statement which retrieves a plurality of records from the database. For example, the select statement may include criteria for indicating which of the records are to be retrieved from the database. To this end, the database may process the select statement based on the associated criteria to identify the records meeting the criteria.

Additionally, at least one aggregate operator (e.g. function is processed to group (e.g. aggregate) at least a subset of the records based on a field of the records. Note operation 304. In particular, the aggregate operator may include criteria specifying the field of the records based on which the records are to be grouped. The database may process the aggregate operator based on the associated criteria place, in a group, the selected records having a common value in the specified field. Thus, each resulting group may be specific to a different value included in the field of all of the selected records.

Further, a grouped records object is generated to return the subset of the records, as shown in operation 306. In the present embodiment, the grouped records object may be of an object type that is the same as the object type utilized for returning individual records included in the database. With respect to such embodiment, grouped values may be included in a single field of a single record. Just by way of example, for each of the groups identified in operation 304, a single record may be generated where each field of the record groups the values included in the corresponding field of all of the grouped records. Optionally, a representative value per group may be utilized as the unique record identifier (e.g. a minimum value of all of the values of a particular field of the group).

In another embodiment, the grouped records object may be of an object type that is specific to grouped records. Optionally, the grouped records object may only have an identifier field and a get any (i.e. get_any( )) field for use in accessing the records being grouped. For example, the get any field for a particular grouped records object may identify each record in the subset of the records included in the associated group. In one embodiment, the object type that is specific to grouped records may be describable, but not necessarily directly queryable.

Moreover, as shown in decision 308, it is determined whether an alias for the column of the field has been configured by a user. The user may be a user associated with a tenant from which the query being processed by the present method 300 has been received. For example, the user may have requested processing of the query by the database.

It should be noted that the column of the field includes a column of the database which includes the field according to which the records are grouped (i.e. the field indicated by the criteria associated with the aggregate operator). In the present embodiment, the column may include a column specific to a resultset returned by the query which includes the aforementioned field. Thus, the alias may be particular to the resultset.

Optionally, the user may be capable of entering the alias via a graphical user interface (GUI) associated with the database. Furthermore the decision 308 may be performed upon the user selecting an option to save the alias as the identifier of the column of the resultset. If it is determined that an alias has not been received, an alias is automatically generated for the column of the resultset. Note operation 310. For example, the alias may be automatically generated by the database or otherwise by another sub-system of the multi-tenant on-demand database system.

In one embodiment, the alias may be automatically generated using a predefined format. Just by way of example, the predefined format may include a string of predefined values having an indicator of the column position in the database (i.e. the ith column position) appended thereto. Of course, such alias may be automatically generated in any desired manner.

In response to a determination that the alias has been received from the user, the alias is validated. Note operation 312. The alias may be validated using any predetermined validation rules indicating a valid format and valid content for an alias of a column of an aggregated resultset. For example, the validation may include the rules shown in Table 1. Of course, it should be noted that the rules shown in Table 1 are set forth for illustrative purposes only, and should not be construed as limiting in any manner.

TABLE 1

| | |
|---|---|
| 1. | The alias must be valid query language identifiers. |
| 2. | The alias must be unique. |
| 3. | The alias cannot be of any predetermined form reserved for other purposes. |
| 4. | The alias must not equal any of the existing column names of the database. |

To this end, validating the alias may include confirming that the alias meets all of the predetermined validation rules. As shown in decision 314, it is therefore determined whether the alias is allowed (i.e. whether the alias has been validated). For example, such determination may be based on whether it has been confirmed that the alias meets all of the predetermined validation rules.

If the alias is not allowed (i.e. does not meet one of the predetermined validation rules), a new alias is requested from the user. Note operation 316. If, however, the alias is allowed, the alias is stored as an identifier of the column, as shown in operation 318.

Additional Embodiments

Table 2 illustrates one example of query which may be performed in the context of the method 300 of FIG. 3. Again, it should be noted that the query is set forth for illustrative purposes only, and should not be construed as limiting in any manner.

TABLE 2 select account.ownership, sum(num_c)
from contact
group by account.ownership
having sum(num_c) > 0
order by account.ownership, max(lastName)
limit 1

As shown in Table 2, the SELECT list contains scalar values, which is allowed since they are grouped as well as aggregate values. The HAVING clause may optionally only contain operations on aggregated values. The ORDER clause can also contain scalar grouped values, or aggregate expressions. Finally the LIMIT clause applies to the final resultset size.

Table 3 shows an example of a query that does not include a GROUP clause. Yet again, it should be noted that the query is set forth for illustrative purposes only, and should not be construed as limiting in any manner.

TABLE 3 select sum(num_c), count(lastname), max(salutation)
from contact

As shown, when the query has no GROUP clause, aggregate functions can still be used (i.e. in which case all expressions may be aggregates), and the resultset may only have a single row. In other optional embodiments, the HAVING clause and WHERE clause may support expressions (e.g. using parentheses, AND, OR, NOT, etc.). The IN clause may also be allowed.

Still yet, in one embodiment, for tenants supporting multi-currency, currency values included in the records may be normalized (i.e. transformed into a single currency format), prior to performing an aggregate function on the records. In one embodiment, the currency values may be normalized into a format specific to the user's locale.

In another embodiment, various filters may be applied to the aggregated records. For example, when MAX or MIN are used as the aggregate function, the resultset may be sorted using a special metadata-defined picklist order. Other column types such as record type name, current values, etc. may also have special sorting expressions.

In yet, another embodiment, the query may aggregate based on time to find, for example, total sales by calendar quarter. For example, calendar date expressions that are available natively in SQL from Oracle™. For instance, TO_CHAR(<datetime>, 'MM') returns the month number from 1 to 12. These date operators shown in Table 4 may be enabled to enhance this feature. Optionally, these operators can be applied to any date column, standard or custom.

As a further option, days may be interpreted relative to the user's time zone, for datetime fields. Note also that the user may filter based on these expressions as well, in a WHERE clause. The FISCAL_* functions may shift months by the amount of the tenant's custom calendar.

TABLE 4

Figure 4:
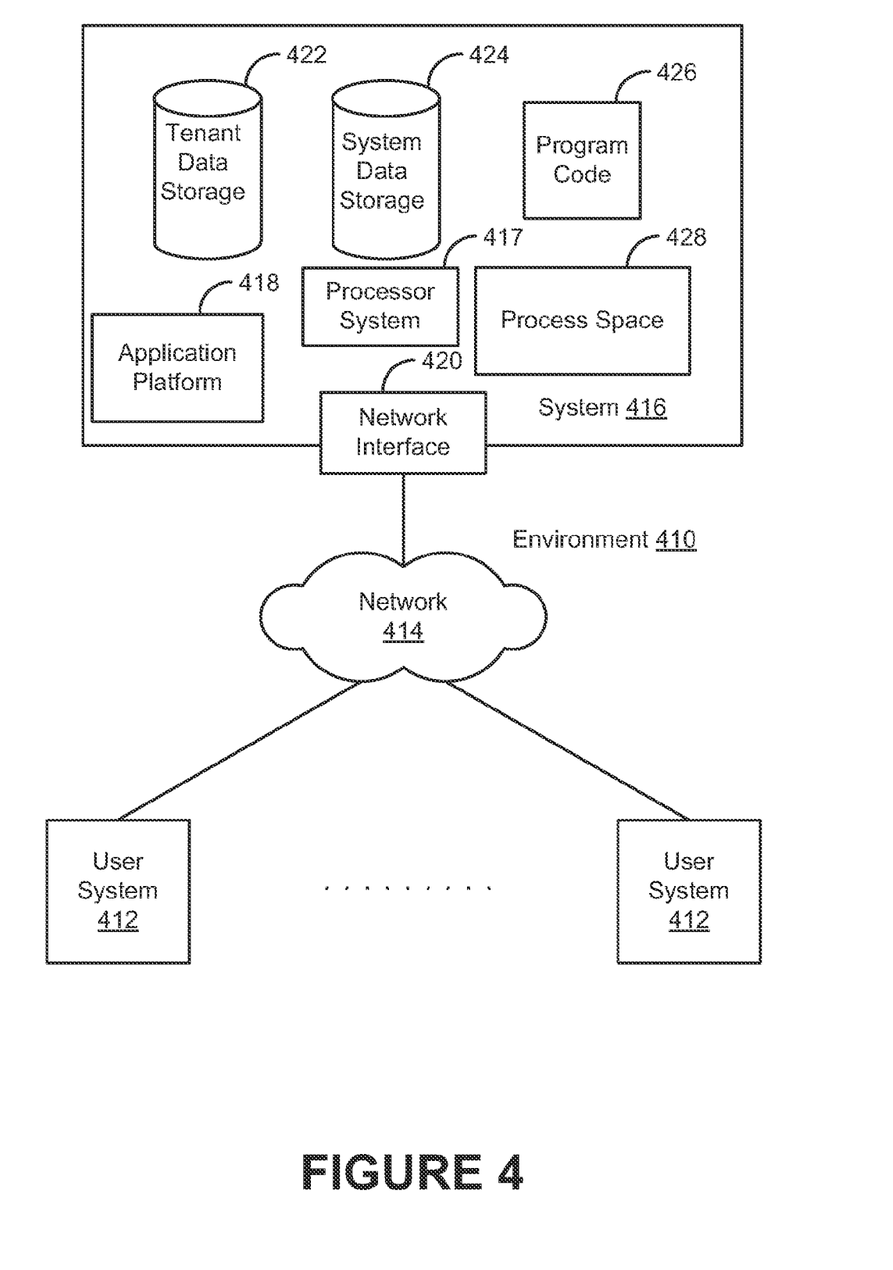
FIG. 4 illustrates a block diagram of an example of an environment wherein an on-demand database service might be used.

```
<enumItem name="CALENDAR_YEAR" dbValue="CALENDAR__YEAR"/>
<enumItem name="CALENDAR_QUARTER" dbValue="CALENDAR_QUARTER"/>
<enumItem name="CALENDAR__MONTH" dbValue="CALENDAR_MONTH"/>
<enumItem name="FISCAL_YEAR" dbValue="FISCAL_YEAR"/>
<enumItem name="FISCAL_QUARTER" dbValue="FISCAL_QUARTER"/>
<enumItem name="FISCAL_MONTH" dbValue="FISCAL_MONTH"/>
<enumItem name="WEEK_IN_YEAR" dbValue="WEEK_IN_YEAR"/>
<enumItem name="WEEK_IN_MONTH" dbValue="WEEK_IN_MONTH"/>
<enumItem name="DAY_IN_YEAR" dbValue="DAY_IN_YEAR"/>
<enumItem name="DAY_IN_MONTH" dbValue="DAY_IN_MONTH"/>
<enumItem name="DAY_IN_WEEK" dbValue="DAY_IN_WEEK"/>
<enumItem name="DAY_ONLY" dbValue="DAY_ONLY"/>      Only for DateTime fields
<enumItem name="HOUR_IN_DAY" dbValue=" HOUR_IN_DAY "/>    Only for DateTime fields
``` not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 416" and "system 416" will be used interchangeably herein. A database image may include one or more database objects. A relational database management system (RDMS) or the equivalent may execute storage and retrieval of information against the database object(s). Application platform 418 may be a framework that allows the applications of system 416 to run, such as the hardware and/or software, e.g., the operating system. In an embodiment, on-demand database service 416 may include an application platform 418 that enables creation, managing and executing one or more applications developed by the provider of the on-demand database service, users accessing the on-demand database service via user systems 412, or third party application developers accessing the on-demand database service via user systems 412.

The users of user systems 412 may differ in their respective capacities, and the capacity of a particular user system 412 might be entirely determined by permissions (permission levels) for the current user. For example, where a salesperson is using a particular user system 412 to interact with system 416, that user system has the capacities allotted to that salesperson. However, while an administrator is using that user system to interact with system 416, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 414 is any network or combination of networks of devices that communicate with one another. For example, network 414 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples

System Overview

FIG. 4 illustrates a block diagram of an environment 410 wherein an on-demand database service might be used. Environment 410 may include user systems 412, network 414, system 416, processor system 417, application platform 418, network interface 420, tenant data storage 422, system data storage 424, program code 426, and process space 428. In other embodiments, environment 410 may not have all of the components listed and/or may have other elements instead of, or in addition to, those listed above.

Environment 410 is an environment in which an on-demand database service exists. User system 412 may be any machine or system that is used by a user to access a database user system. For example, any of user systems 412 can be a handheld computing device, a mobile phone, a laptop computer, a work station, and/or a network of computing devices. As illustrated in FIG. 4 (and in more detail in FIG. 5) user systems 412 might interact via a network 414 with an on-demand database service, which is system 416.

An on-demand database service, such as system 416, is a database system that is made available to outside users that do herein. However, it should be understood that the networks that the one or more implementations might use are not so limited, although TCP/IP is a frequently implemented protocol.

User systems 412 might communicate with system 416 using TCP/IP and, at a higher network level, use other common Internet protocols to communicate, such as HTTP, FTP, AFS, WAP, etc. In an example where HTTP is used, user system 412 might include an HTTP client commonly referred to as a "browser" for sending and receiving HTTP messages to and from an HTTP server at system 416. Such an HTTP server might be implemented as the sole network interface between system 416 and network 414, but other techniques might be used as well or instead. In some implementations, the interface between system 416 and network 414 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 416, shown in FIG. 4, implements a web-based customer relationship management (CRM) system. For example, in one embodiment, system 416 includes application servers configured to implement and execute CRM software applications as well as provide related data, code, forms, webpages and other information to and from user systems 412 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 416 implements applications other than, or in addition to, a CRM application. For example, system 416 may provide tenant access to multiple hosted (standard and custom) applications, including a CRM application. User (or third party developer) applications, which may or may not include CRM, may be supported by the application platform 418, which manages creation, storage of the applications into one or more database objects and executing of the applications in a virtual machine in the process space of the system 416.

One arrangement for elements of system 416 is shown in FIG. 4, including a network interface 420, application platform 418, tenant data storage 422 for tenant data 423, system data storage 424 for system data 425 accessible to system 416 and possibly multiple tenants, program code 426 for implementing various functions of system 416, and a process space 428 for executing MTS system processes and tenant-specific processes, such as running applications as part of an application hosting service. Additional processes that may execute on system 416 include database indexing processes.

Several elements in the system shown in FIG. 4 include conventional, well-known elements that are explained only briefly here. For example, each user system 412 could include a desktop personal computer, workstation, laptop, PDA, cell phone, or any wireless access protocol (WAP) enabled device or any other computing device capable of interfacing directly or indirectly to the Internet or other network connection. User system 412 typically runs an HTTPS client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 412 to access, process and view information, pages and applications available to it from system 416 over network 414. Each user system 412 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) conjunction with pages, forms, applications and other information provided by system 416 or other systems or servers. For example, the user interface device can be used to access data and applications hosted by system 416, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 412 and all of its components are operator configurable using applications, such as a browser, including computer code run using a central processing unit such as an Intel Pentium® processor or the like. Similarly, system 416 (and additional instances of an MTS, where more than one is present) and all of their components might be operator configurable using application(s) including computer code to run using a central processing unit such as processor system 417, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 416 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 416 is configured to provide webpages, forms, applications, data and media content to user (client) systems 412 to support the access by user systems 412 as tenants of system 416. As such, system 416 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 5:
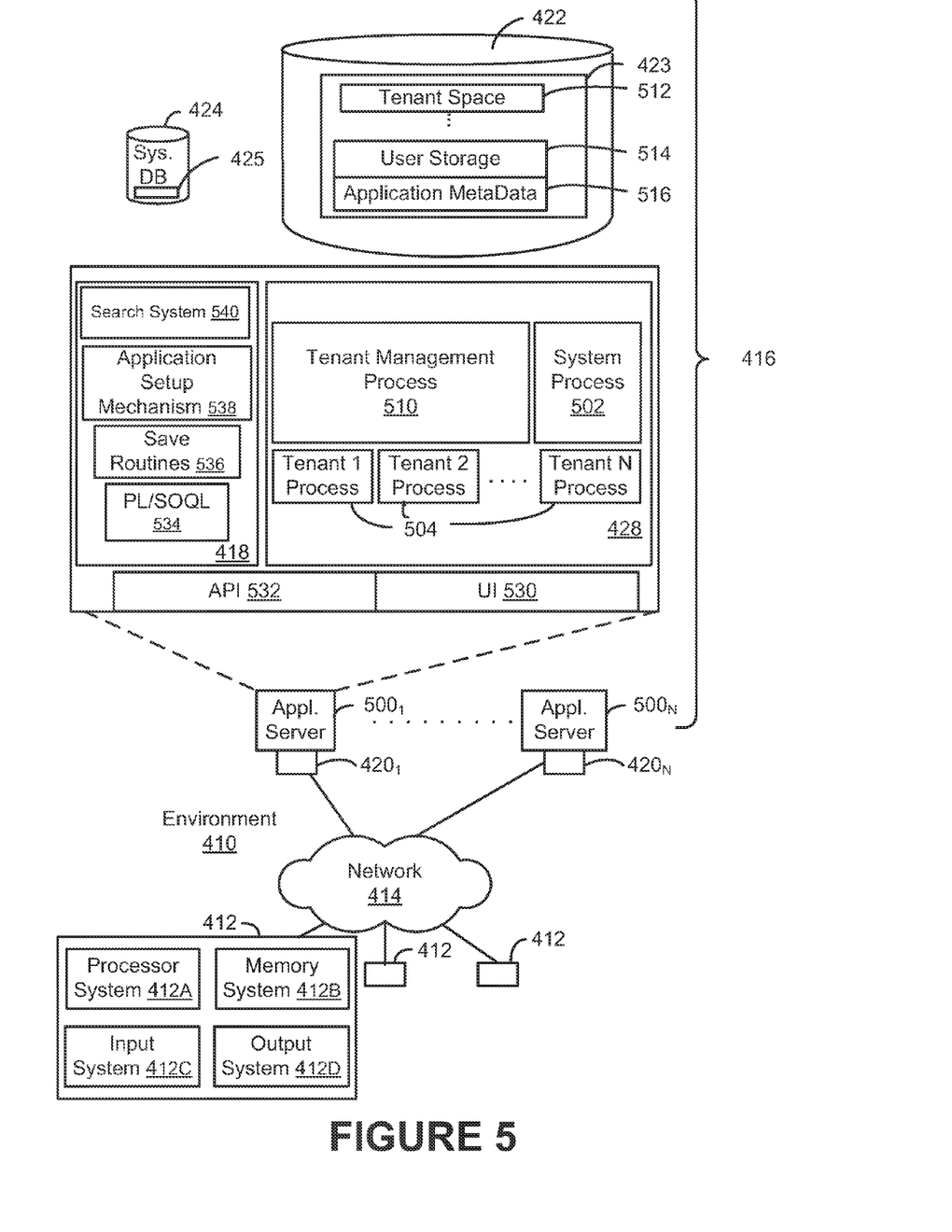
FIG. 5 illustrates a block diagram of an embodiment of elements of FIG. 4 and various possible interconnections between these elements.

FIG. 5 also illustrates environment 410. However, in FIG. 5 elements of system 416 and various interconnections in an embodiment are further illustrated. FIG. 5 shows that user system 412 may include processor system 412A, memory system 412B, input system 412C, and output system 412D. FIG. 5 shows network 414 and system 416. FIG. 5 also shows that system 416 may include tenant data storage 422, tenant data 423, system data storage 424, system data 425, User Interface (UI) 530, Application Program Interface (API) 532, PL/SOQL 534, save routines 536, application setup mechanism 538, applications servers $500_1$-$500_N$, system process space 502, tenant process spaces 504, tenant management process space 510, tenant storage area 512, user storage 514, and application metadata 516. In other embodiments, environment 410 may not have the same elements as those listed above and/or may have other elements instead of, or in addition to, those listed above.

User system 412, network 414, system 416, tenant data storage 422, and system data storage 424 were discussed above in FIG. 4. Regarding user system 412, processor system 412A may be any combination of one or more processors. Memory system 412B may be any combination of one or more memory devices, short term, and/or long term memory. Input system 412C may be any combination of input devices, such as one or more keyboards, mice, trackballs, scanners, cameras, and/or interfaces to networks. Output system 412D may be any combination of output devices, such as one or more monitors, printers, and/or interfaces to networks. As shown by FIG. 5, system 416 may include a network interface 420 (of FIG. 4) implemented as a set of HTTP application servers 500, an application platform 418, tenant data storage 422, and system data storage 424. Also shown is system process space 502, including individual tenant process spaces 504 and a tenant management process space 510. Each application server 500 may be configured to tenant data storage 422 and the tenant data 423 therein, and system data storage 424 and the system data 425 therein to serve requests of user systems 412. The tenant data 423 might be divided into individual tenant storage areas 512, which can be either a physical arrangement and/or a logical arrangement of data. Within each tenant storage area 512, user storage 514 and application metadata 516 might be similarly allocated for each user. For example, a copy of a user's most recently used (MRU) items might be stored to user storage 514. Similarly, a copy of MRU items for an entire organization that is a tenant might be stored to tenant storage area 512. A UI 530 provides a user interface and an API 532 provides an application programmer interface to system 416 resident processes to users and/or developers at user systems 412. The tenant data and the system data may be stored in various databases, such as one or more Oracle™ databases.

Application platform 418 includes an application setup mechanism 538 that supports application developers' creation and management of applications, which may be saved as metadata into tenant data storage 422 by save routines 536 for execution by subscribers as one or more tenant process spaces 504 managed by tenant management process 510 for example. As an option, the application platform YY18 may further include a search system 540. Invocations to such applications may be coded using PL/SOQL 534 that provides a programming language style interface extension to API 532. A detailed description of some PUSOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manage retrieving application metadata 516 for the subscriber making the invocation and executing the metadata as an application in a virtual machine.

Each application server 500 may be communicably coupled to database systems, e.g., having access to system data 425 and tenant data 423, via a different network connection. For example, one application server $500_1$ might be coupled via the network 414 (e.g., the Internet), another application server $500_{N-1}$ might be coupled via a direct network link, and another application server $500_N$ might be coupled by yet a different network connection. Transfer Control Protocol and Internet Protocol (TCP/IP) are typical protocols for communicating between application servers 500 and the database system. However, it will be apparent to one skilled in the art that other transport protocols may be used to optimize the system depending on the network interconnect used.

In certain embodiments, each application server 500 is configured to handle requests for any user associated with any organization that is a tenant. Because it is desirable to be able to add and remove application servers from the server pool at any time for any reason, there is preferably no server affinity for a user and/or organization to a specific application server 500. In one embodiment, therefore, an interface system implementing a load balancing function (e.g., an F5 Big-IP load balancer) is communicably coupled between the application servers 500 and the user systems 412 to distribute requests to the application servers 500. In one embodiment, the load balancer uses a least connections algorithm to route user requests to the application servers 500. Other examples of load balancing algorithms, such as round robin and observed response time, also can be used. For example, in certain embodiments, three consecutive requests from the same user could hit three different application servers 500, and three requests from different users could hit the same application server 500. In this manner, system 416 is multi-tenant, wherein system 416 handles storage of, and access to, different objects, data and applications across disparate users and organizations.

As an example of storage, one tenant might be a company that employs a sales force where each salesperson uses system 416 to manage their sales process. Thus, a user might maintain contact data, leads data, customer follow-up data, performance data, goals and progress data, etc., all applicable to that user's personal sales process (e.g., in tenant data storage 422). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 416 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 416 might also maintain system level data usable by multiple tenants or other data. Such system level data might include industry reports, news, postings, and the like that are sharable among tenants.

In certain embodiments, user systems 412 (which may be client systems) communicate with application servers 500 to request and update system-level and tenant-level data from system 416 that may require sending one or more queries to tenant data storage 422 and/or system data storage 424. System 416 (e.g., an application server 500 in system 416) automatically generates one or more SQL statements (e.g., one or more SQL queries) that are designed to access the desired information. System data storage 424 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A computer program product, comprising a non-transitory computer usable medium having a computer readable program code embodied therein, the computer readable program code adapted to be executed to implement a method for conditionally performing a query including an aggregate function, the method comprising:
   receiving a query including a selection function for selecting a plurality of records and an aggregate function to be performed on the records once selected by the selection function;
   determining a number of the records associated with the performance of the aggregate function by counting the records to be selected by the selection function; and
   conditionally performing the query based on the number of the records, by:
      identifying an amount of a predefined usage allotment that is available for use, the predefined usage allotment including a total number of records allowed to be processed over a predetermined period of time,
      blocking performance of the query in response to a determination that the number of the records exceeds the available usage, and
      performing the query in response to a determination that the number of the records does not exceed the available usage, including:
         grouping at least a subset of the records during the performance of the query, using the aggregate function, and
         returning the grouped at least the subset of the records using an object type specific to aggregated records, wherein the object type only includes an identifier field and a get any field, wherein the identifier field is utilized to identify each record in the at least a subset of the records grouped during the performance of the query, and wherein the get any field is a function for accessing the at least a subset of the records grouped during the performance of the query.

2. The computer program product of claim 1, wherein the query selects the records from a table in a database.

3. The computer program product of claim 1, wherein the at least the subset of the records is grouped according to criteria defined in the query.

4. The computer program product of claim 3, wherein the criteria includes a field of the records.

5. The computer program product of claim 4, wherein the criteria includes at least one value of the field of the records.

6. The computer program product of claim 1, wherein the records associated with the performance of the aggregate function includes records processed by the aggregate function.

7. The computer program product of claim 6, wherein the records processed by the aggregate function include records input to the aggregate function.

8. The computer program product of claim 1, wherein the predefined usage allotment is specific to a tenant of a multi-tenant on-demand database system from which the query is received.

9. The computer program product of claim 1, wherein the get any field identifies each record in the at least the subset of the records.

10. The computer program product of claim 1, further comprising reducing the amount of the predefined usage allotment that is available for use by the determined number of the records.

11. A method, comprising:
receiving a query including a selection function for selecting a plurality of records and an aggregate function to be performed on the records once selected by the selection function;
determining a number of the records associated with the performance of the aggregate function, utilizing a processor, by counting the records to be selected by the selection function; and
conditionally performing the query based on the number of the records, by:
identifying an amount of a predefined usage allotment that is available for use, the predefined usage allotment including a total number of records allowed to be processed over a predetermined period of time,
blocking performance of the query in response to a determination that the number of the records exceeds the available usage, and
performing the query in response to a determination that the number of the records does not exceed the available usage, including:
grouping at least a subset of the records during the performance of the query, using the aggregate function, and
returning the grouped at least the subset of the records using an object type specific to aggregated records, wherein the object type only includes an identifier field and a get any field, wherein the identifier field is utilized to identify each record in the at least a subset of the records grouped during the performance of the query, and wherein the get any field is a function for accessing the at least a subset of the records grouped during the performance of the query.

12. An apparatus, comprising:
a processor for:
receiving a query including a selection function for selecting a plurality of records and an aggregate function to be performed on the records once selected by the selection function;
determining a number of the records associated with the performance of the aggregate function by counting the records to be selected by the selection function; and
conditionally performing the query based on the number of the records, by:
identifying an amount of a predefined usage allotment that is available for use, the predefined usage allotment including a total number of records allowed to be processed over a predetermined period of time,
blocking performance of the query in response to a determination that the number of the records exceeds the available usage, and
performing the query in response to a determination that the number of the records does not exceed the available usage, including:
grouping at least a subset of the records during the performance of the query, using the aggregate function, and
returning the grouped at least the subset of the records using an object type specific to aggregated records, wherein the object type only includes an identifier field and a get any field, wherein the identifier field is utilized to identify each record in the at least a subset of the records grouped during the performance of the query, and wherein the get any field is a function for accessing the at least a subset of the records grouped during the performance of the query.

13. A method for transmitting code, comprising:
transmitting code to receive a query including a selection function for selecting a plurality of records and an aggregate function to be performed on the records once selected by the selection function;
transmitting code to determine a number of the records associated with the performance of the aggregate function by counting the records to be selected by the selection function, utilizing a processor; and
transmitting code to conditionally perform the query based on the number of the records, by:
identifying an amount of a predefined usage allotment that is available for use, the predefined usage allotment including a total number of records allowed to be processed over a predetermined period of time,
blocking performance of the query in response to a determination that the number of the records exceeds the available usage, and
performing the query in response to a determination that the number of the records does not exceed the available usage, including:
grouping at least a subset of the records during the performance of the query, using the aggregate function, and
returning the grouped at least the subset of the records using an object type specific to aggregated records, wherein the object type only includes an identifier field and a get any field, wherein the identifier field is utilized to identify each record in the at least a subset of the records grouped during the performance of the query, and wherein the get any field is a function for accessing the at least a subset of the records grouped during the performance of the query.

* * * * *